H. W. MATHESON AND G. E. GRATTAN.
MANUFACTURE OF ACETIC ANHYDRIDE.
APPLICATION FILED APR. 25, 1918.
1,425,500.
Patented Aug. 8, 1922.
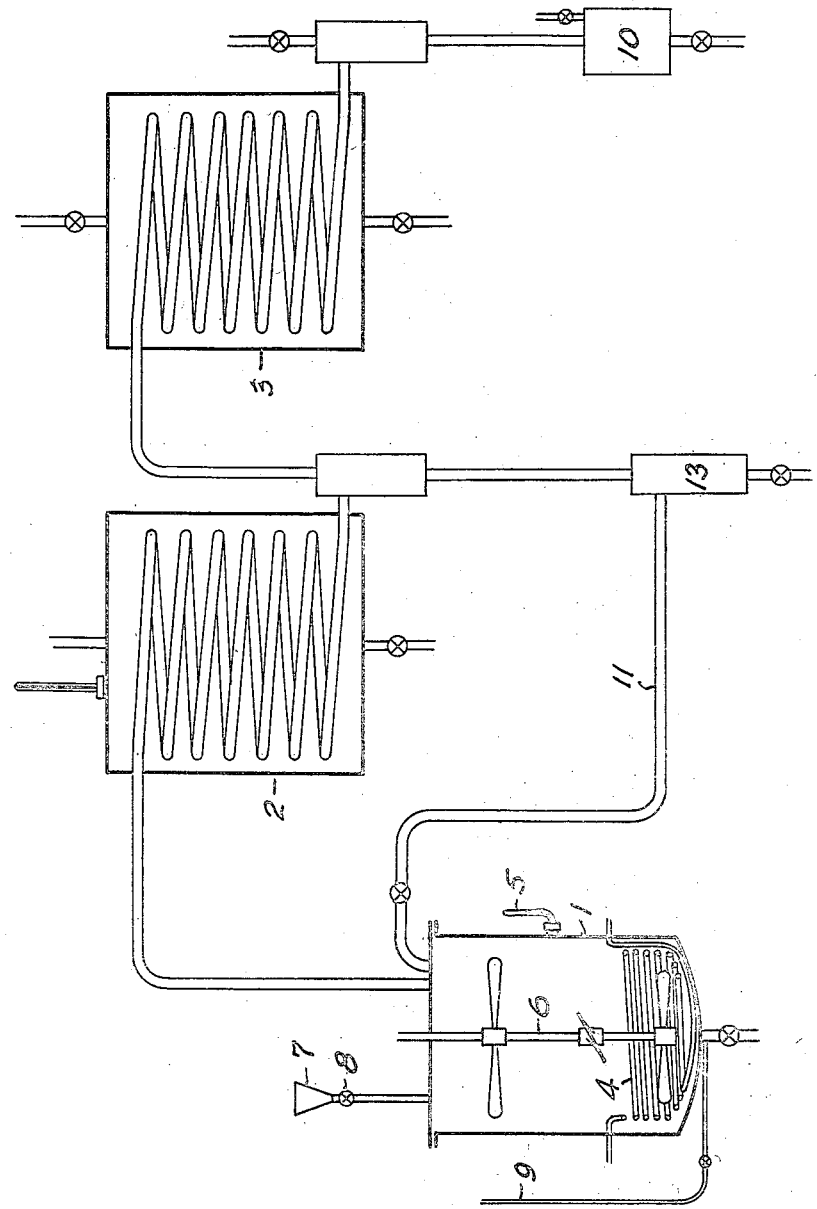
Inventors
Howard W. Matheson
George E. Grattan
By
Attys.

UNITED STATES PATENT OFFICE.

HOWARD W. MATHESON AND GEORGE E. GRATTAN, OF SHAWINIGAN FALLS, QUEBEC, CANADA, ASSIGNORS TO SHAWINIGAN LABORATORIES LIMITED, OF MONTREAL, QUEBEC, CANADA.

MANUFACTURE OF ACETIC ANHYDRIDE.

1,425,500.      Specification of Letters Patent.      Patented Aug. 8, 1922.

Application filed April 25, 1918. Serial No. 230,807.

*To all whom it may concern:*

Be it known that we, HOWARD W. MATHESON and GEORGE E. GRATTAN, both subjects of the King of Great Britain, and residents of Shawinigan Falls, in the Province of Quebec and Dominion of Canada, have invented certain new and useful Improvements in the Manufacture of Acetic Anhydride, of which the following is a full, clear, and exact description.

This invention relates to improvements in the manufacture of acetic anhydride, and the object of the invention is to provide for the production of this material from inexpensive and easily obtainable raw products, in order that manufacture may be carried out at a low cost.

A further object is to provide for the manufacture in a direct, rapid and inexpensive manner.

A still further object is to provide for the manufacture in such a way that the apparatus used is comparatively simple and inexpensive.

Acetic anhydride has previously been made for the most part by either of two processes which are long and involved, requiring the use of expensive equipment. These processes are furthermore not economical. According to one of these processes, acetic anhydride has been made by the action of phosphorous oxychlorides or similar phosphorus compounds of acetic acid or acetic acid salts; according to the other process by the action of sulphur monochloride or similar compounds or anhydrous sodium acetate or other suitable salts of acetic acid.

It has also been proposed in patent specifications to produce acetic anhydride from acetic acid and acetylene. This method, however, depends on the production of ethylidene diacetate and its decomposition by the action of catalysts at a high temperature.

According to the present invention, acetic anhydride is formed in one step by the action of acetylene gas on commercial glacial acetic acid in the presence of finely divided salt of mercury. The acetylene may be used under atmospheric or super-atmospheric pressure. The acid is heated to a temperature of from 60° to 200° C. according to the pressure under which the reaction takes place, and is kept violently agitated until the absorption of acetylene is complete. By this process, acetic anhydride is formed directly and in a comparatively short time.

In order to facilitate comprehension of the process, a diagrammatic illustration of the apparatus used is annexed.

The following example will serve to explain the process more fully:—

Five hundred grams of purified acetic acid of 96% to 100% concentration is placed in a container 1, provided with reflux condensers 2 and 3, the former of which is preferably a water condenser and the latter a brine condenser. The reaction vessel 1 is provided with cooling coils 4, a thermometer 5 and an agitating apparatus 6. The acid is heated to a temperature of about 90° C. and twenty-five grams of mercury oxide added and dissolved in the acid. Approximately twelve to thirteen grams of concentrated sulphuric acid are then slowly added to precipitate the mercury as mercuric sulphate. These ingredients may conveniently be introduced through the funnel 7 and valve 8. Acetylene gas in excess is then passed into the reaction kettle through the pipe 9 under a pressure of approximately forty pounds per square inch above atmospheric. The temperature is allowed to rise to 130° to 140° C., being regulated by passing water through the cooling coils 4. After a period of from one to two hours the absorption of acetylene is complete and the mixture in the kettle consists of acetic anhydride mixed with ethylidene diacetate and a small amount of acetaldehyde. During the period of absorption, the agitator 6 is kept in operation, so as to promote contact of all portions of the acid with the acetylene. During the process, an equal pressure is maintained in the reaction vessel and condensers and the major portion of the acetaldehyde produced is collected in a receiver 10 connected with the brine condenser 3. Any acetic acid carried over by the excess acetylene is condensed in the condenser 2 and runs back into the reaction through the pipe 11. The water condenser 2 is kept at an approximate temperature of 20° to 25° C. From this condenser, the gas passes through the pipe 12 to the brine condenser 3, where any acetaldehyde is condensed and eliminated from the reaction. Any mercury which may be carried over into the condensers will be retained in the trap 13. The process as described is represented by the equation;—

$$C_2H_2 + 2CH_3COOH = (CH_3CO)_2O + CH_3CHO.$$

The material in the reaction vessel is then filtered to remove mercury which has been reduced in the process and the resultant product is purified by distillation.

From the foregoing description, it will be seen that the anhydride is produced quickly and economically from inexpensive and readily obtainable materials and by the use of a simple and inexpensive apparatus. The anhydride is furthermore produced directly, so that the production is much more economical than is possible by the indirect methods previously referred to. Unabsorbed acetylene which escapes from the brine condenser may be returned into the reaction vessel 1 by means of a pump or other suitable apparatus.

It has been stated in the foregoing example that the pressures in the reaction vessel and condensers are equal. This condition is preferred as the process may be more easily carried out and the apparatus is more simple, but it will be obvious that the process may be carried out under different pressures.

While the example describes mercuric sulphate as the catalyst, it will be understood that the invention is not limited to this particular salt but includes any suitable mercury salt introduced as such or produced in the reaction liquor.

The best results are obtained by using the specific temperatures and concentrations given in the example, but it has been found by experiment that other temperatures and various degrees of concentration may be used and the desired result obtained.

It has been stated in the foregoing example that the pressures in the reaction vessel and condensers are equal. This condition is preferred as the process may be more easily carried out and the apparatus is more simple, but it will be obvious that the process may be carried out under different pressures.

Having thus described our invention, what we claim is;—

1. A process for the manufacture of acetic anhydride, which comprises passing acetylene through acetic acid of 96% to 100% concentration at a temperature of from 60° centigrade to 200° centigrade in the presence of a finely divided salt of mercury.

2. A process according to claim 1, in which the acid is maintained in violent agitation during passage of the acetylene therethrough.

3. A process for the manufacture of acetic anhydride, which comprises passing acetylene gas in excess of the combinable amount through acetic acid of 96% to 100% concentration at a temperature between 60° and 200° centigrade, and separating entrained acetic acid from the excess acetylene by condensation, and returning the acid into the reaction.

4. In combination with a process according to claim 3, the additional step of separating acetaldehyde formed in the reaction from excess acetylene by a condensation separate from that employed to separate the entrained acid.

5. A process for the manufacture of acetic anhydride which comprises successively adding approximately two parts of mercury oxide and approximately one part of concentrated sulphuric acid to forty parts of acetic acid of 96% to 100% concentration, passing acetylene gas through the mixture, and maintaining a temperature between 60° and 200° centigrade.

6. A process for the manufacture of acetic anhydride, which comprises heating acetic acid of 96% to 100% concentration to a temperature of approximately 90° centigrade, successively adding mercury oxide and sulphuric acid, passing acetylene gas through the mixture, and maintaining a temperature between 60° and 200° centigrade for the period of the reaction.

7. In combination with a process according to claim 6, separating entrained acetic acid and acetaldehyde formed in the reaction by successive condensing operations, the first condensation being carried out at a temperature above the condensation point of acetaldehyde and below the condensation point of acetic acid, and returning the acetic acid recovered to the reaction.

8. A process according to claim 1, in which the reaction is carried out under super-atmospheric pressure.

9. A process according to claim 1, carried out at a pressure of approximately 40 pounds per square inch super-atmospheric.

In witness whereof, we have hereunto set our hands.

HOWARD W. MATHESON.
GEORGE E. GRATTAN.